June 3, 1924.
R. J. ALTGELT ET AL
1,496,441
POWER LIFT MECHANISM FOR PLOWS
Filed April 25, 1923
6 Sheets-Sheet 1
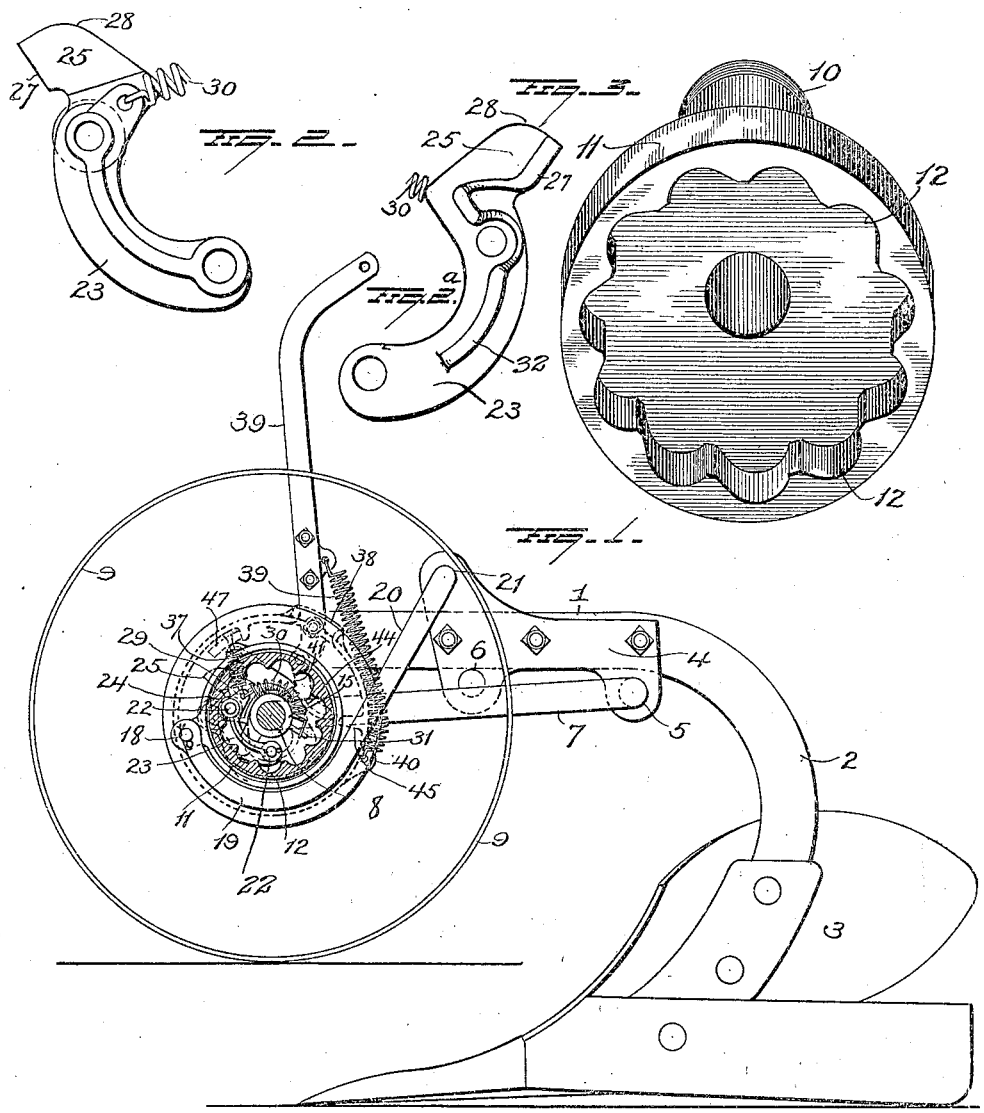
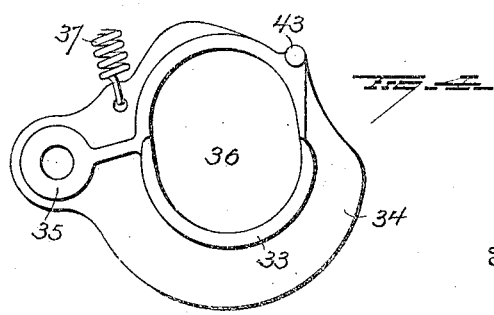
Inventors
R. J. Altgelt and
C. H. Gemberling
By Seymour & Bright
Attorneys

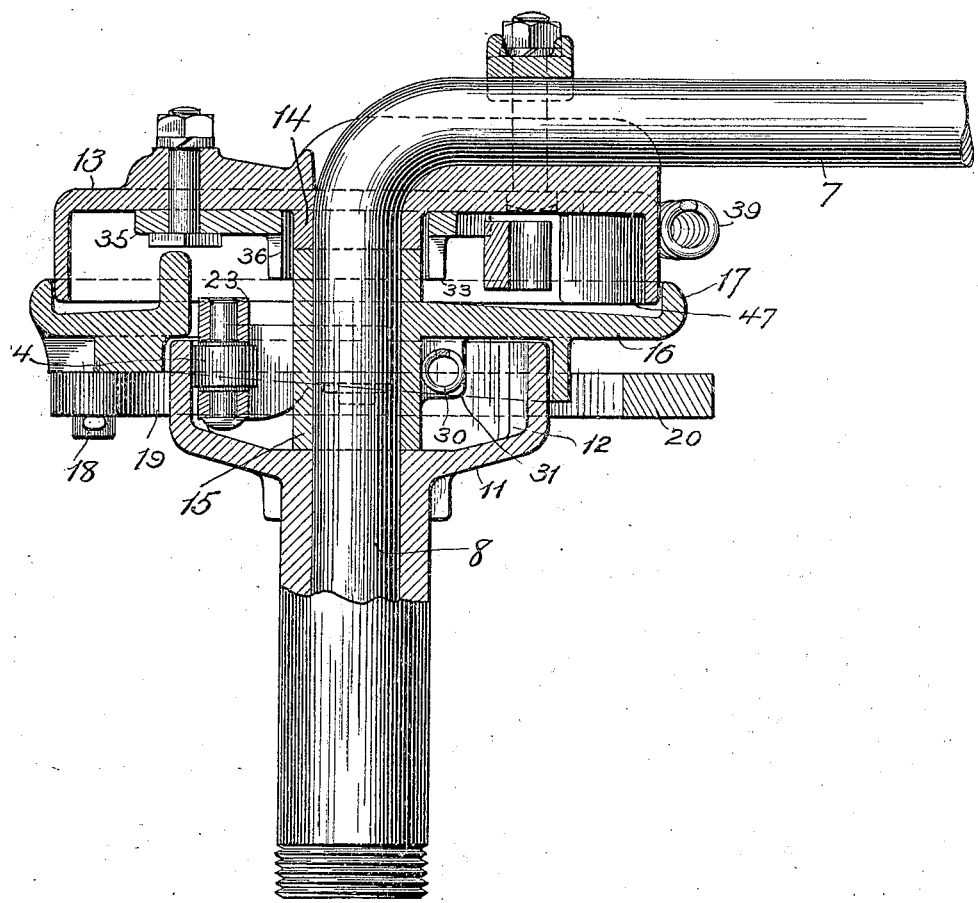

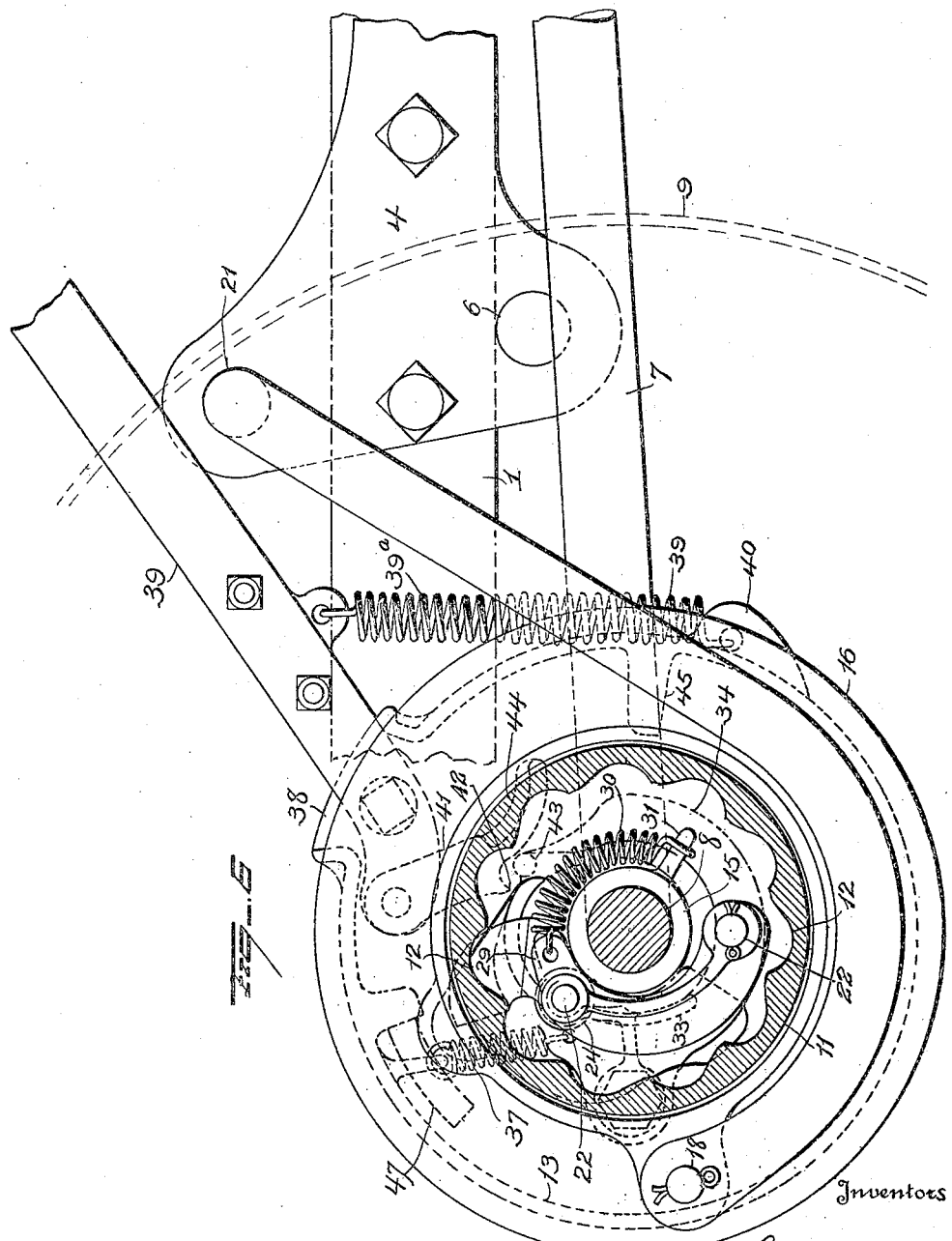

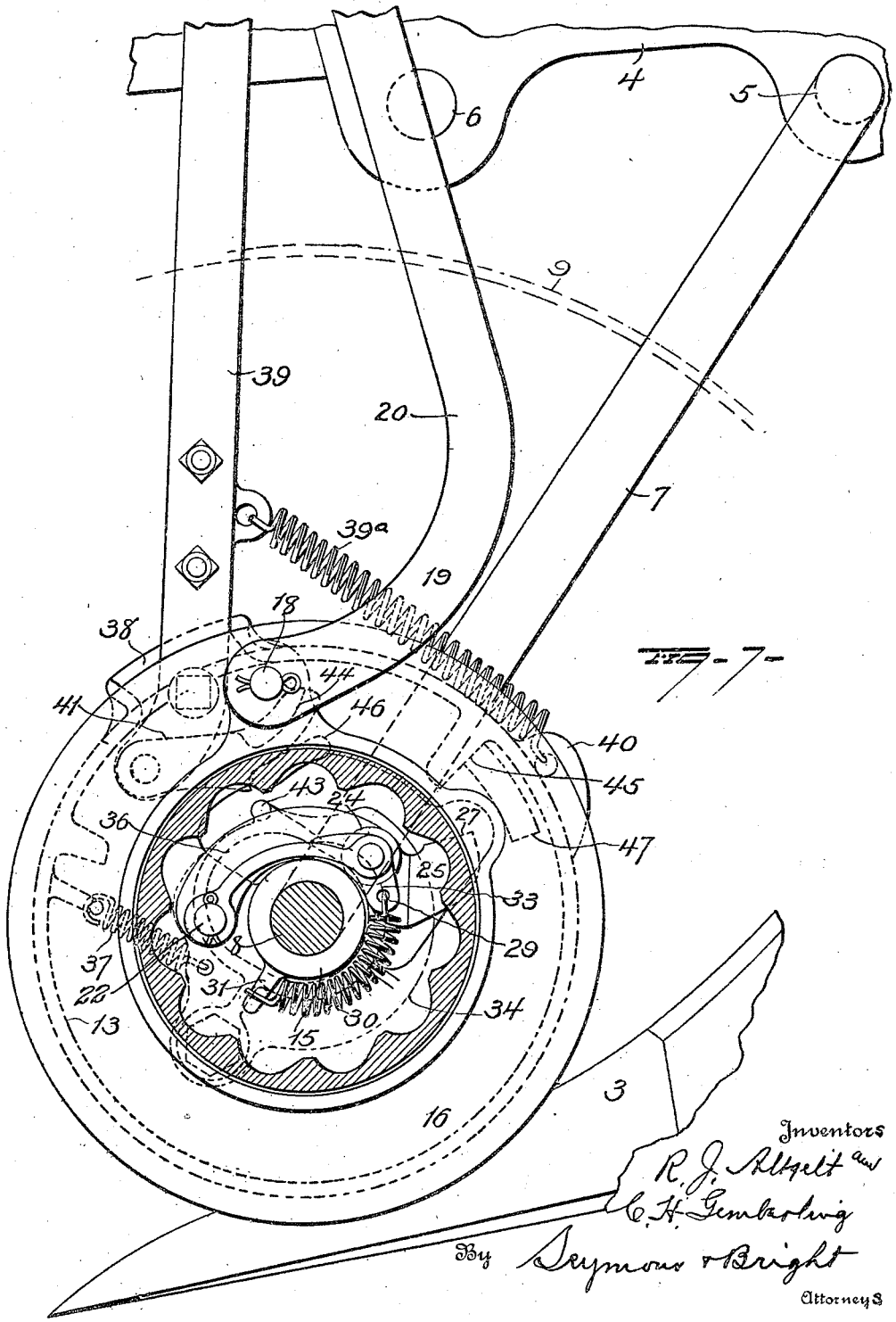

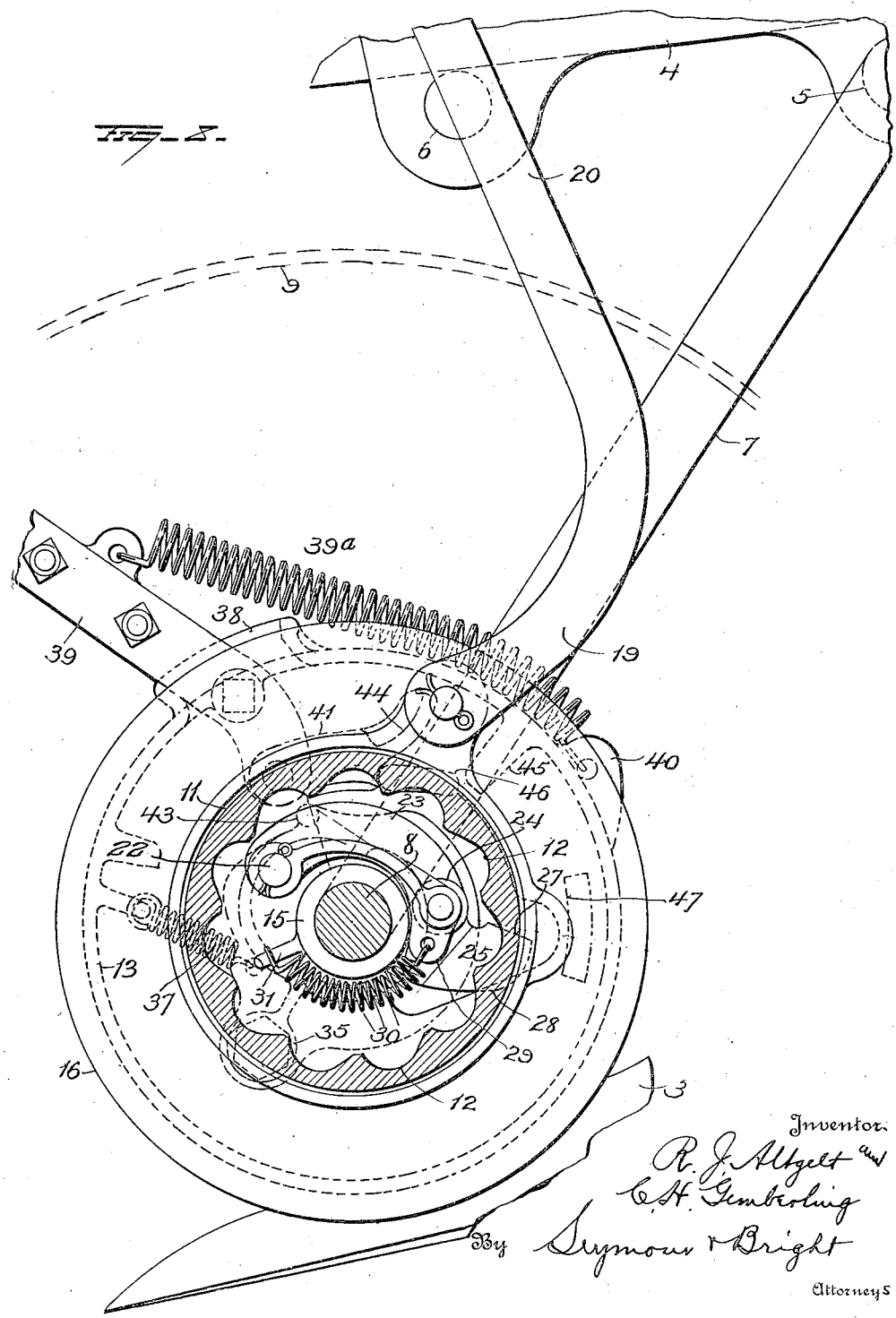

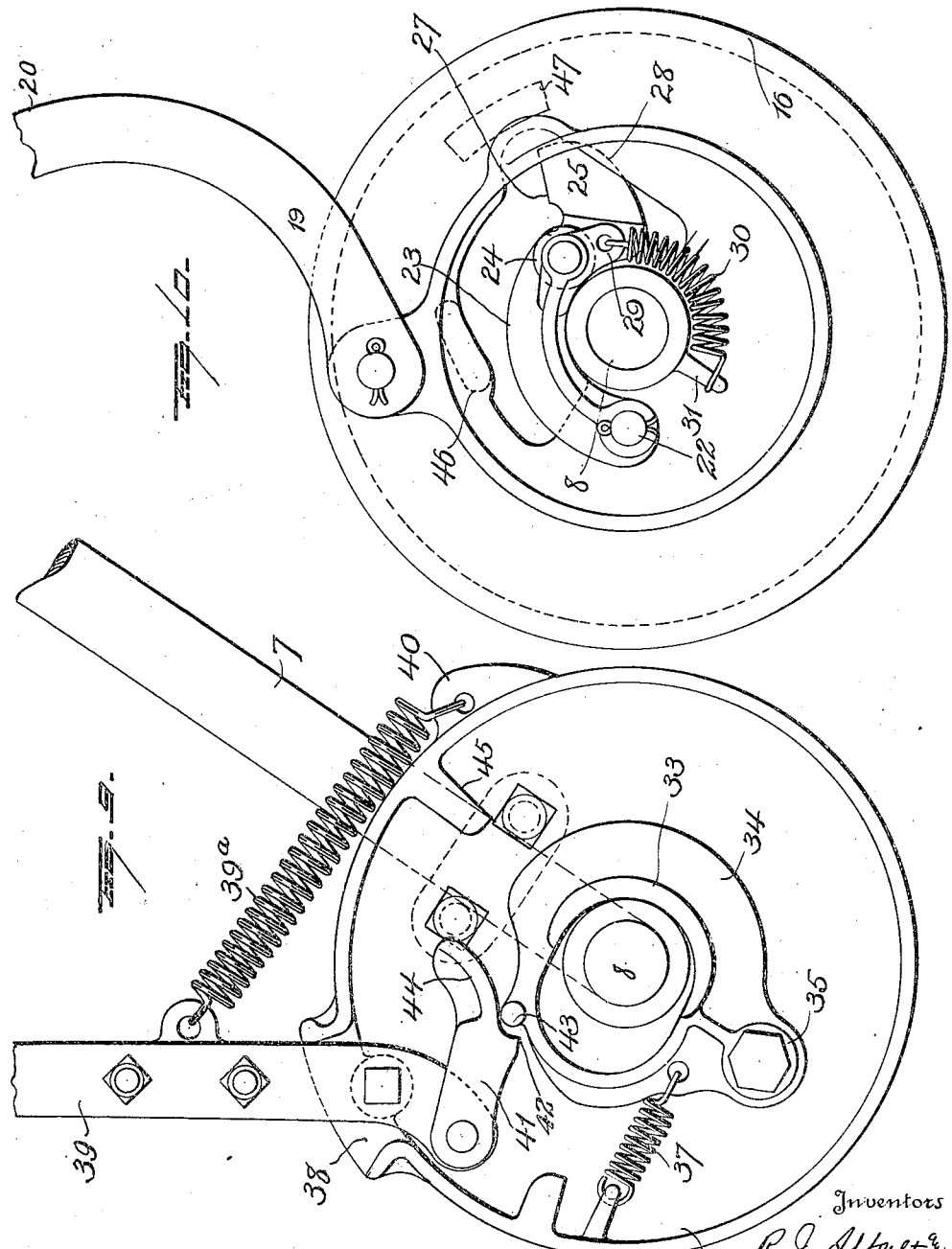

Patented June 3, 1924.

1,496,441

UNITED STATES PATENT OFFICE.

RUDOLPH J. ALTGELT AND CAMERON H. GEMBERLING, OF SOUTH BEND, INDIANA, ASSIGNORS TO OLIVER CHILLED PLOW WORKS, OF SOUTH BEND, INDIANA.

POWER LIFT MECHANISM FOR PLOWS.

Application filed April 25, 1923. Serial No. 634,546.

*To all whom it may concern:*

Be it known that we, RUDOLPH J. ALTGELT and CAMERON H. GEMBERLING, citizens of the United States, and residents of South Bend, in the county of Saint Joseph and State of Indiana, have invented certain new and useful Improvements in Power Lift Mechanism for Plows; and we do hereby declare the following to be a full, clear, and exact description of the invention, such as will enable others skilled in the art to which it appertains to make and use the same.

This invention relates to improvements in power lift mechanism for plows, of that type in which power derived from a carrying wheel is utilized directly to raise the plow frame,—our present invention having special reference to the clutch devices whereby a carrying wheel is operatively connected with or disconnected from the lifting elements.

One object of our invention is to provide clutch mechanism of the roller and corrugated or recessed wheel type, in which the lifting element shall move in one direction to the extent of a three-quarter (more or less) throw during the lifting operation and afterwards moved backwardly when the plow frame is dropped to bring the plow bases to working positions.

With this and other objects in view, the invention consists in certain novel features of construction and combinations of parts as hereinafter set forth and pointed out in the claims.

In the accompanying drawings,—

Figure 1 is a view partly in elevation and partly in section illustrating an application of our improvement.

Figures 2 and 2ª are enlarged detail views of the member 23 of the clutch mechanism.

Figure 3 is an enlarged view showing the corrugated or recessed wheel carried by a wheel box.

Figure 4 is an enlarged detail view of the member 34 of the clutch mechanism.

Figure 5 is a transverse sectional view partly in elevation.

Figure 6 is an enlarged elevation (partly in section) showing positions which the parts assume when the plows are in the lowered or working position.

Figure 7 is a similar view showing the positions of the parts when the plow frame is elevated.

Figure 8 is a similar view showing the positions of the parts when the trip lever has been operated to cause the plow frame to drop.

Figure 9 is a face view showing the clutch housing and parts carried thereby, and Figure 10 is a face view showing the lifting disk and parts carried thereby.

In the drawings, the plow frame is indicated by the beam 1, the latter being provided at its rear end with a standard 2, to which a plow base 3 is secured,—it being understood however that the frame may comprise a plurality of beams suitably spaced and braced and each carrying a plow base as shown and described in application for patent of Herman E. Altgelt filed on April 25th, 1923, and designated by Serial No. 634,547.

In the embodiment of the invention shown in the drawings, bearing brackets such as indicated at 4 are secured to the frame for the accommodation of crank axles. The land wheel crank axle 5 is mounted in the rear portions of the bearing brackets 4 as indicated in Figure 1 and the furrow wheel crank axle (not shown) is mounted in the forward portions of said brackets at 6. At the free end of the crank 7 of axle 5, a spindle portion 8 is provided for the accommodation of a land wheel 9. The hub box 10 (Figure 3) for the land wheel is provided at its inner end with a flanged wheel 11 having an interior annular series of corrugations or recesses 12 for cooperation with clutch mechanism hereinafter described,— said flanged wheel constituting in effect part of such clutch mechanism.

A flanged disk or housing 13 is rigidly secured to the land wheel crank axle so as to encircle the spindle portion 8 thereof,—said housing being provided centrally with a hub portion 14 encircling said spindle. The hub 15 of a lifting disk 16 is mounted loosely on the spindle 8 and said hub normally abuts against the hub 14 of the housing. The lifting disk 16 may be provided with a peripheral flange 17 encircling the housing 13. The lifting disk 16 is provided with a pin 18 with which the lower curved end portion 19 of a lifting arm 20 is pivotally connected, said lifting arm having pivotal connection with the plow frame as at 21, Figure 1, so that when the lifting disk is turned in one direction, motion will be transmitted through the medium of the lifting arm 19—20 to the frame to raise the same until the connection of said arm at 18 on the lifting disk shall have passed a dead center position which might be indicated by a line passing from the axle spindle 8 to the connection at 21 of the lifting arm to the frame and when these positions shall have been reached, the plow frame will be held supported in its elevated position.

The lifting disk has pivoted thereto at 22 (Figure 10) a curved arm 23 which carries near its free end a roller 24 and the free end of said arm is made with an integral dog or projection 25 which extends through an opening 26 in the lifting disk and is made with a straight face 27 and a curved face 28. The free end portion of the arm 23 (which arm may be conveniently termed the "roller arm") is provided with a lug or ear 29 with which one end of a spring 30 is connected, the other end of said spring being attached to a lug 31 on the lifting disk at the hub portion thereof. The spring 30 serves to normally hold the roller arm in the position shown in Figure 10 but means are provided for moving said roller arm against the resistance of said spring so as to cause the roller to engage in one or another of the corrugations or recesses 12 in the wheel 11 associated and rotatable with the land wheel 9 and thus operatively connect the lifting disk with said land wheel. The roller arm 23 is made with an inwardly projecting curved flange 32 which partially embraces a curved flange 33 on a plate lever 34 pivotally attached at 35 to the housing member 13 and having an elongated opening 36 for the accommodation of the hub of said housing and to permit pivotal movement of said lever plate. The lever plate 34 is retained in normal position by means of a spring 37 and when said lever plate is moved from such position, its flange 33 cooperating with the flange 32 of the roller arm, will cause the latter to be moved outwardly and its roller to engage the corrugated wheel 11. The housing 13 is provided with an opening 38 in which a control lever 39 is pivotally supported and held in a normal position by the action of a spring 39ª attached at one end to said lever and at the other end to a lug 40 on the housing 13. A dog 41 is loosely pivoted to the lower short arm of the control lever 39 and is provided with a tooth 42 to engage a lug or shoulder 43 on the lever plate 34 and said dog is also provided at its free end portion with a tongue 44 having a curved face. It is apparent that by operating the control lever in one direction, the engagement of the tooth 42 of dog 41 with the lug or shoulder 43 of the lever plate 34, will cause said plate to be moved in the manner above described to effect the clutching of the lifting disk to the land wheel. A lug 45 located within the housing 13 is in such position that as the lifting disk approaches the upper end of its throw, said lug will engage the face 27 of the dog or projection 25 on the roller arm and force said roller arm inwardly to disengage the roller 24 from the corrugated wheel 11. The lifting disk is provided on its inner face with a lug or projection 46 which, when the lifting disk approaches the upper end of its throw during the lifting operation, will engage the tongue 44 of the pivoted dog 41 and lift the latter out of reach of the lug or shoulder 43 on the lever plate 34 and when the lifting disk reaches the end of its lifting movement, the lug or projection 46 will engage the tooth 42 of the dog 41 and further turning movement of the lifting disk will be prevented. In order to avoid depending upon engagement of the lug 46 with the tooth of the pivoted dog 41 to limit the lifting throw of the disk 16, the latter is provided on its inner face with a fixed lug 47 which abuts against the lug 45 in the housing when the lifting disk reaches the end of its lifting throw.

When the plow is at work, the parts of the clutch and lifting mechanism will be in the positions shown in Figures 1 and 6. Should the control lever be now moved forwardly, the cooperation of the dog 41 with the lever plate 34 will cause the latter to be moved and the lifting disk to be clutched to the land wheel in the manner previously explained. Rotation of the land wheel will now cause the lifting disk to be turned approximately three fourths of a rotation, during which power will be transmitted through the lifting arm 19—20 to the frame to elevate the latter and the pivotal connection of the lifting arm with the lifting disk having now passed a dead center position, the frame will be held supported in its elevated position. During the turning of the lifting disk the dog 41 will be raised out of reach of the lever plate 34; the roller arm will be moved to disengage the roller 24 from the corrugated wheel 11 (unclutching the lifting disk from the land wheel) and the tooth 42 of the now elevated dog 41 will be in position to engage the lug or projection 46 on the lifting disk as shown in Figure 7. Should the control lever 39 be now moved forwardly the engagement of the tooth 42 of dog 41 with the lug 46 on the lifting disk will cause sufficient backward movement of the latter to overcome the dead center position of its pivotal connection with the lifting arm as shown in Figure 8 and the power frame may now drop by gravity to its working position.

Having fully described our invention what we claim as new and desire to secure by Letters Patents, is:

1. In mechanism of the character described, the combination with an axle and a wheel, of a housing member rigid with the axle, an oscillatory lifting disk loose on the axle, a corrugated member carried by the wheel, a spring-held roller arm carried by said disk for cooperation with said corrugated member, a control lever, and means carried by the housing and cooperable with said roller arm to move the latter into cooperable relation to the corrugated member.

2. In mechanism of the character described, the combination with an axle and a wheel, of a housing member rigid with the axle, an oscillatory lifting disk loose on the axle, a corrugated member carried by the wheel, a spring-held roller arm carried by said disk for cooperation with said corrugated member, a control lever, means carried by the housing and cooperable with said roller arm to move the latter into cooperable relation to the corrugated member, and means for automatically moving said roller arm out of cooperable relation with said corrugated member when the lifting disk shall have made a partial rotation.

3. In mechanism of the character described, the combination with an axle and a wheel, of a housing member rigid with the axle, an oscillatory lifting disk loose on the axle, a corrugated member carried by the wheel, a spring-held roller arm carried by said disk for cooperation with said corrugated member, a control lever, means carried by the housing and cooperable with said roller arm to move the latter into cooperable relation to the corrugated member, means for automatically moving said roller arm out of cooperable relation with said corrugated member when the lifting disk shall have made a partial rotation, and means for causing said lifting disk to be rotated backwardly.

4. In mechanism of the character described, the combination with a member to be raised, an axle and a wheel, of a corrugated member carried by the wheel, a housing rigid with the axle, a lifting disk mounted loosely on the axle, a spring-held pivoted arm mounted on said disk and carrying a roller for cooperation with said corrugated member, a lifting arm connecting the lifting disk with the member to be raised, a control lever, a dog pivoted thereto, means carried by the housing and operable by the control lever dog to move the roller on the pivoted arm into cooperative relation with the corrugated member, means operable automatically to disengage said roller from the corrugated member, when the lifting disk has made a partial rotation and its connection with the lifting arm shall have passed a dead center, and means cooperable with the control lever dog whereby said dead center may be overcome and the member to be raised permitted to drop by gravity.

5. In mechanism of the character described, the combination with a member to be raised, an axle and a wheel, of a corrugated member carried by the wheel, a housing fixed to the axle, an oscillatory lifting disk mounted loosely on the axle, means connecting said disk with the member to be raised, a spring-retained arm carrying a roller for cooperation with the corrugated member, a spring-retained lever plate movably connected with said housing cooperable with said arm to move the roller on said arm into cooperative relation with said corrugated member, means for operating said lever plate, and means whereby said arm will be moved to disengage its roller from said corrugated member when the lifting disk shall have made a partial rotation.

6. In mechanism of the character described, the combination with a member to be raised, an axle and a wheel, of a corrugated member carried by the wheel, a housing fixed to the axle, an oscillatory lifting disk mounted loosely on the axle, means connecting said disk with the member to be raised, a spring-retained arm carrying a roller for cooperation with the corrugated member, a spring-retained lever plate movably connected with said housing cooperable with said arm to move the roller on said arm into cooperative relation with said corrugated member, means for operating said lever plate, means whereby said arm will be moved to disengage its roller from said corrugated member when the lifting disk shall have made a partial rotation, and means for causing said lifting disk to turn backwardly.

7. In mechanism of the character described, the combination with a member to be raised, a wheel and an axle, of a corrugated member carried by said wheel, a housing fixed to the axle, a lifting disk loose on the axle, a connection between said lifting disk and the member to be raised, a spring-held roller arm carried by said disk and cooperable with said roller arm, a movable spring-held member carried by said housing and cooperable with said roller arm to move the latter into cooperative relation with the corrugated member, a control lever mounted on the housing, a dog pivoted to said lever and cooperable with said spring-held movable member to move the latter, means for moving the roller arm out of cooperative relation with the corrugated member when the lifting disk has made a partial rotation, and means on the disk with which the pivoted dog on the control lever is cooperable to give the disk a partial backward turn.

In testimony whereof, we have signed this specification in the presence of two subscribing witnesses.

RUDOLPH J. ALTGELT.
CAMERON H. GEMBERLING.

Witnesses:
EMMA ULLERY,
JENNIE DAVIS.